United States Patent
Suzuki et al.

(10) Patent No.: US 10,740,088 B2
(45) Date of Patent: Aug. 11, 2020

(54) COUNTERMEASURE VERIFICATION ASSISTANCE SYSTEM AND METHOD

(71) Applicant: Hitachi, Ltd., Chiyoda-ku, Tokyo (JP)

(72) Inventors: Takanobu Suzuki, Tokyo (JP); Masakuni Agetsuma, Tokyo (JP); Jun Nemoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 64 days.

(21) Appl. No.: 16/324,083

(22) PCT Filed: Nov. 14, 2016

(86) PCT No.: PCT/JP2016/083633
§ 371 (c)(1),
(2) Date: Feb. 7, 2019

(87) PCT Pub. No.: WO2018/087906
PCT Pub. Date: May 17, 2018

(65) Prior Publication Data
US 2020/0192654 A1 Jun. 18, 2020

(51) Int. Cl.
*G06F 9/455* (2018.01)
*H04L 29/06* (2006.01)
(Continued)

(52) U.S. Cl.
CPC ............ *G06F 8/65* (2013.01); *G06F 9/45558* (2013.01); *G06F 16/285* (2019.01); *G06F 2009/4557* (2013.01); *G06Q 10/06313* (2013.01)

(58) Field of Classification Search
CPC .............. G05B 13/028; G05B 13/4183; G05B 13/4184; G05B 13/41845; G05B 13/4185;
(Continued)

(56) References Cited

U.S. PATENT DOCUMENTS 8,789,048 B2 * 7/2014 Bozek .................... G06F 9/461
718/1
9,813,318 B2 * 11/2017 Iyoob ..................... H04L 43/08
10,097,627 B1 * 10/2018 Gafton ............... H04L 67/1004

FOREIGN PATENT DOCUMENTS

JP 2005-107803 A 4/2005

OTHER PUBLICATIONS

Simao et al., A classification of middleware to support virtual machines adaptability in IaaS, 6 pages (Year: 2012).*

* cited by examiner

*Primary Examiner* — Thuy Dao
(74) *Attorney, Agent, or Firm* — Procopio, Cory, Hargreaves & Savitch LLP

(57) ABSTRACT

The computer system executes environment classification of classifying a plurality of subsystems, each being a physical or virtual computer system, into one or more environment groups being one or more groups. The computer system stores classification result data which is data representing a relationship between the environment group and the subsystems belonging to the environment group. The computer system selects, from the classification result data, the environment group to which the subsystem having undergone a problem belongs. The computer system generates a reproduction subsystem which is a virtual subsystem virtually reproducing the subsystem for each of the subsystems belonging to the selected classification result group. The computer system applies the countermeasure to at least one reproduction subsystem for the purpose of verifying the countermeasure for the problem.

12 Claims, 15 Drawing Sheets

(51) Int. Cl.
*G06F 16/28* (2019.01)
*G06F 11/14* (2006.01)
*G06F 8/65* (2018.01)
*G06Q 10/06* (2012.01)

(58) Field of Classification Search
CPC ...... G06F 8/65; G06F 16/285; G06F 9/45558; G06F 16/23; G06F 16/2455; G06F 16/2465; G06F 16/26; G06F 16/282
See application file for complete search history.

FIG. 3

■ FAULT WITH HIGH OCCURRENCE PROBABILITY

| FAULT | MACHINE | COUNTERMEASURE | EFFECT | SIDE EFFECT | APPLY? |
|---|---|---|---|---|---|
| Aaaa | VM A | yyyyy | rrr | Ppp | Yes / No |
| Aaaa | VM B | yyyyy | rrr | Qqq | Yes / No |
| Bbbb | VM C | gggg | uuu | Cccc | Yes / No |
| Xxxx | SERVER A | ddd | Xx | Cxdd | Yes / No |
| Xxxx | SERVER B | ddd | xx | Rtrw | Yes / No |
| Bbbb | SERVER C | gggg | uuu | Xet | Yes / No |

■ FAULT WITH LOW OCCURRENCE PROBABILITY

| FAULT | MACHINE | COUNTERMEASURE | EFFECT | SIDE EFFECT | IMPLEMENT? |
|---|---|---|---|---|---|
| Bbbb | VM A | gggg | uuu | xkxk | Yes / No |

EXECUTE    CANCEL

FIG. 6

ENVIRONMENT DATA
600

| SUBSYSTEM ID: SERVER A | | | | |
|---|---|---|---|---|
| CATEGORY | MODEL | CAPACITY | IMPLEMENTATION QUANTITY | DRIVER |
| CPU | B1 | 8 CORES | 4 CORES | NONE |
| NIC | N1 | 10GbE 2port | 2 | Igb |
| SATA SSD | S1 | 1000G | 8 | SATA DRIVER |
| MEMORY | M1 | 64GB | 8 | NONE |
| OS | O1 | NONE | 1 | NONE |
| OS KERNEL | 4.8 | NONE | 1 | NONE |
| VERSION OF SDS IN OPERATION | 8.0 | NONE | 2 | NONE |
| ... | ... | ... | ... | ... |

FIG. 7

SDS DATA
700

| CATEGORY | TYPE |
|---|---|
| RAID TYPE | RAID6(6D2P), RAID5(7D1P) |
| NUMBER OF VOLUMES TO CREATE | 256 |
| NUMBER OF LU TO CREATE | 256 |
| NUMBER OF EFFECTIVE LU | 256 |
| NUMBER OF PORTS TO USE | 32 |
| CACHE MEMORY CAPACITY | 128GB |
| NUMBER OF PIECES OF SDS IN OPERATION | 2 (SDS A, SDS B) |
| SUBSYSTEM ID | SERVER A |
| ... | ... |

FIG. 8

PERFORMANCE DATA
700

| VOL ID | CAPACITY | R/W RATIO | AVERAGE RESPONSE TIME | AVERAGE I/O THROUGHPUT | SUBSYSTEM ID | RAID TYPE |
|---|---|---|---|---|---|---|
| 0 | 100GB | 6:4 | 1ms | 100MB/s | SERVER A (SDS A) | RAID6(6D 2P) |
| 1 | 100GB | 7:3 | 1ms | 50MB/s | SERVER A (SDS A) | RAID6(6D 2P) |
| 2 | 100GB | 6:4 | 1ms | 200MB/s | SERVER A (SDS B) | RAID5(7D 1P) |
| 3 | 100GB | 2:8 | 1ms | 300MB/s | SERVER A (SDS B) | RAID5(7D 1P) |
| ... | ... | ... | ... | ... | ... | ... |

| I/O OCCURRENCE TIME | VOL ID | TARGET LBA | R/W | TRANSFER LENGTH | SUBSYSTEM ID | RESPONSE TIME |
|---|---|---|---|---|---|---|
| 2016/08/01 23:33:34.01 | 1 | 0x500 | R | 0x400 | SERVER A (SDS A) | 0.5ms |
| 2016/08/01 23:33:34.01 | 2 | 0x600 | W | 0x100 | SERVER A (SDS B) | 0.3ms |
| 2016/08/01 23:33:34.01 | 3 | 0x700 | W | 0x400 | SERVER A (SDS B) | 10ms |
| 2016/08/01 23:33:34.01 | 4 | 0x800 | R | 0x400 | SERVER A (SDS A) | 5ms |
| ... | ... | ... | ... | ... | ... | ... |

FIG. 12

FAULT DATA
<u>1200</u>

| LOCATION OF OCCURRENCE | TIME OF OCCURRENCE | OUTLINE OF FAULT | DETAILS OF FAULT |
|---|---|---|---|
| PCIe PORT 1 in SERVER C (SDS C) | 2016/08/01 23:33:34.01 | LINK-DOWN | bus#=xx, dev#=xx, func#=xx, DEVICE MOUNTED : SAS HBA |
| NIC in SERVER C (SDS C) | 2016/08/01 23:33:34.01 | ETHERNET PORT FAILURE | PORT xx IN NIC xx |
| SSD in SERVER C (SDS D) | 2016/08/01 23:33:34.01 | READING ERROR | LBA=xx, TRANSFER LENGTH = xx, FW Ver = xxxx |
| MEMORY in SERVER C (SDS E) | 2016/08/01 23:33:34.01 | CORRECTABLE ERROR | ADDRESS xx TOTAL SECOND FAULT |
| SDS in VM A (SDS E) | 2016/08/01 23:33:34.01 | DMA TRANSFER TIMEOUT | TRANSFER FROM ADDRESS xx TO ADDRESS yy |
| 0x1234 in VM C (SDS F) | 2016/08/01 23:33:34.01 | CACHE MEMORY ACQUISITION FAILURE | I/O FOR LBA xx OF VOLUME xx |
| 0x4567 in VM C (SDS F) | 2016/08/01 23:33:34.01 | OCCURRENCE OF CACHE MEMORY LOCK CONFLICT | CONFLICT OCCURRED BETWEEN I/O TO LBA xx AND I/O TO LBA yy IN VOLUME xx |
| 0x89ab in VM C (SDS F) | 2016/08/01 23:33:34.01 | EXCESS DRIVE MULTIPLICITY | VOLUME xx AND VOLUME yy |
| ... | ... | ... | ... |

COUNTERMEASURE VERIFICATION ASSISTANCE SYSTEM AND METHOD

CROSS-REFERENCE TO RELATED APPLICATIONS

This application is a U.S. National Stage entry of PCT Application No: PCT/JP2016/083633 filed Nov. 14, 2016, the contents of which are incorporated herein by reference.

TECHNICAL FIELD

The present invention relates generally to the verification of countermeasure (patches, for example).

BACKGROUND ART

There is a known technique of constructing a test environment on the basis of information of a user system and verifying system operation to which a software update patch has been applied in the test environment (PTL 1).

CITATION LIST

Patent Literature

PTL 1: JP 2005-107803 A

SUMMARY OF INVENTION

Technical Problem

There is a conceivable user system including a plurality of (a large number of) subsystems. Herein the "subsystem" is represented by one or more computers such as a physical or virtual server, for example, existing in the user system.

It is difficult to construct such a large-scale user system as a test environment for the purpose of verifying countermeasures such as software update patches.

Moreover, even though such a test environment of the user system is constructed, it would be difficult to determine the subsystem as a countermeasure verification target. For example, there is a possibility of occurrence of similar problems in a server other than subsystem having a problem (error or bug, for example), and there might be a subsystem that would receive unnecessary effects of application of a countermeasure for the problem (for example, a certain type of performance degradation). On the other hand, determining all the subsystems as verification targets might produce extra cost for countermeasure verification.

Solution to Problem

A computer system executes environment classification of classifying a plurality of subsystems, each being a physical or virtual computer system, into one or more environment groups being one or more groups. The computer system stores classification result data which is data representing a relationship between the environment group and the subsystems belonging to the environment group. The computer system selects, from the classification result data, the environment group to which the subsystem having undergone a problem belongs. The computer system generates a reproduction subsystem which is a virtual subsystem virtually reproducing the subsystem for each of the subsystems belonging to the selected classification result group. The computer system applies the countermeasure to at least one reproduction subsystem for the purpose of verifying the countermeasure for the problem.

Advantageous Effects of Invention

It is possible to appropriately narrow down the verification target of the countermeasure.

BRIEF DESCRIPTION OF DRAWINGS

FIG. 3 is a schematic diagram illustrating an example of a management screen displayed by a user management computer.
FIG. 6 is a schematic diagram illustrating a configuration of environment data.
FIG. 7 is a schematic diagram illustrating a configuration of SDS data.
FIG. 8 is a schematic diagram illustrating a configuration of performance data.
FIG. 12 is a schematic diagram illustrating a configuration of fault data.

DESCRIPTION OF EMBODIMENTS

Figure 1:
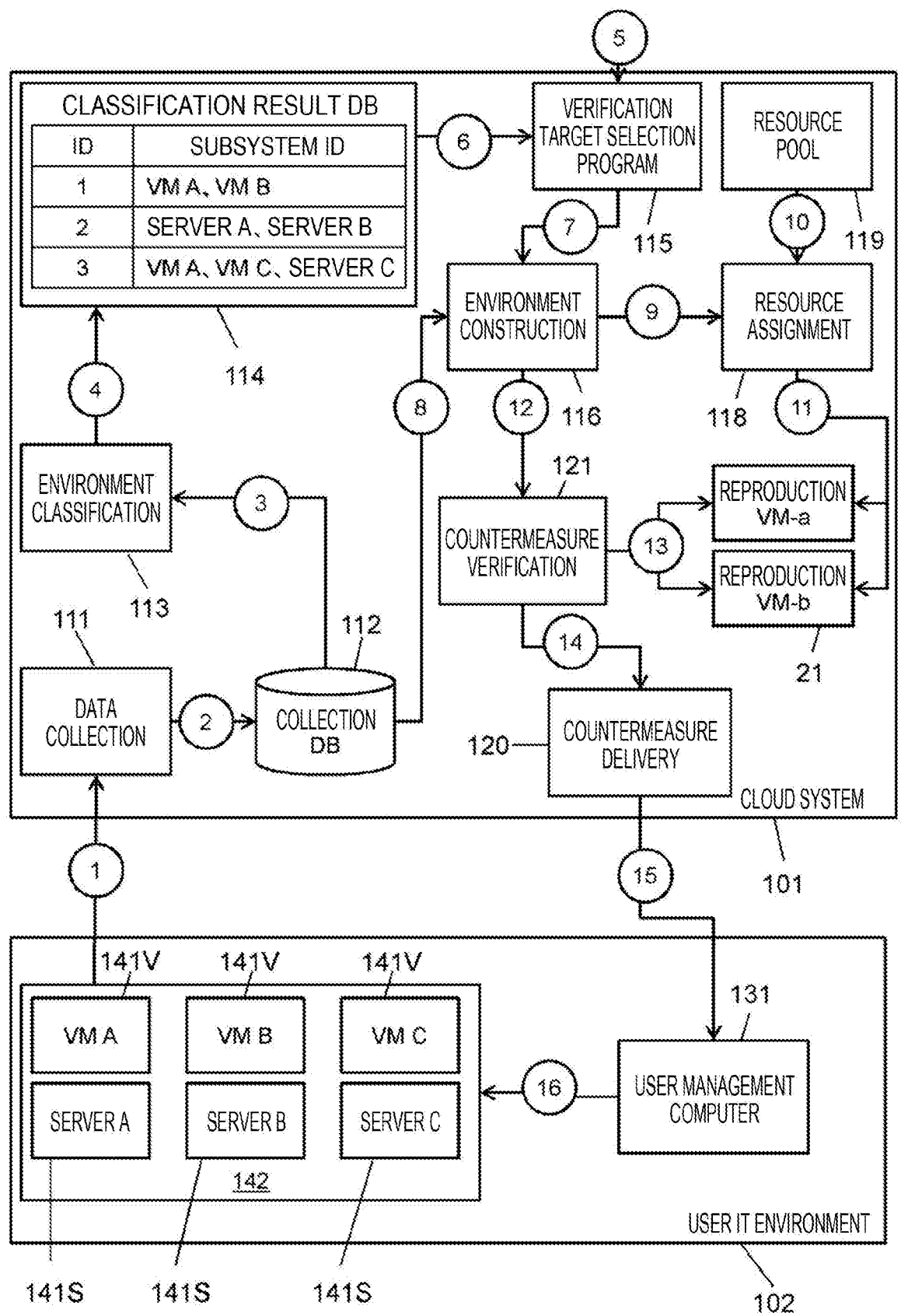
FIG. 1 is a schematic diagram illustrating a configuration of an entire system according to a first embodiment.

Hereinafter, several embodiments will be described with reference to the drawings.

In the following description, an "interface unit" includes one or more interfaces. The one or more interfaces may be one or more interface devices of a same type (one or more network interface cards (NIC)) or two or more interface devices of different types (such as NIC and host bus adapter (HBA), for example). In the following description, the interface device will be abbreviated as "I/F" in some cases.

Moreover, a "memory unit" includes one or more memory devices in the following description. At least one memory may be a volatile memory or a nonvolatile memory.

In the following description, the "processor unit" includes one or more processors. Typically, at least one processor is a central processing unit (CPU). The processor may include hardware circuitry that performs a portion or all of the processing. Each of the processors may be a single-core processor or a multi-core processor.

While the following describes information in terms of an expression such as "xxx table" in some cases, information may be represented by any data structure. That is, "xxx table" can be referred to as "xxx information" to indicate that the information does not depend on data structure. Furthermore, each of the table configurations is an example in the following description. One table may be divided into two or more tables, and all or a part of two or more tables may be one table.

In addition, in the following description, reference signs (or common parts in reference signs) might be used in describing the same type of elements without distinction, and element IDs (or reference signs of element) might be used in describing the same type of elements with distinction.

In the following description, a "computer system" is a system including one or more computers. Therefore, a "computer system" may be either a single computer or a plurality of computers, or may include a device other than a computer, in addition to a computer. The one or more computers typically include at least one physical computer. The one or more computers may include at least one virtual computer.

In addition, in the following description, a "management system" may include one or more computers. Specifically, for example, in a case where the management computer has a display device and the management computer displays information on its own display device, the management computer may be a management system. Furthermore, for example, in a case where a management computer (for example, a server) transmits display information to a remote display computer (for example, a client) and the display computer displays the information (in a case where the management computer displays information on the display computer), a system including at least a management computer among the management computer and the display computer may be defined as the management system. In the following embodiments, both the user management computer and the cloud management computer are examples of the management system.

Furthermore, in the following description, a "drive" means a physical storage device, and may typically be a nonvolatile storage device (for example, an auxiliary storage device). The drive may be, for example, a hard disk drive (HDD) or a solid state drive (SSD). The storage system may include a mixture of different types of drives.

In the following description, "RAID" stands for Redundant Array of Independent (or Inexpensive) Disks. A RAID group includes a plurality of drives (typically, the same type of drives), and stores data in accordance with the RAID level associated with the RAID group.

First Embodiment

FIG. 1 is a schematic diagram illustrating a configuration of the entire system according to the first embodiment.

There is a user information technology (IT) environment 102 and a cloud system 101.

The user IT environment 102 is a user's information system. The user IT environment 102 includes a work environment 142 and a management computer (hereinafter referred to as a user management computer) 131 configured to manage the work environment 142.

The work environment 142 is an example of a user system. The work environment 142 includes a plurality of subsystems (computer systems) 141. Each of the plurality of subsystems 141 executes software defined storage (SDS). Accordingly, the subsystem 141 is execution environment of the SDS (execution body of SDS). In the present embodiment, the plurality of subsystems 141 includes a plurality of physical servers 141S (servers A to C) and a plurality of virtual machines (VM) 141V (VM A to VM C). The VM 141V is executed by a physical server (not illustrated). One or more pieces of SDS are executed in one subsystem 141.

The cloud system 101 is an information system including a resource pool 119. The resource pool 119 is a set of a plurality of computer resources (for example, processors, memory devices, interface devices) of a plurality of types of computer resources. The cloud system 101 executes a data collection program 111, an environment classification program 113, a verification target selection program 115, an environment construction program 116, a countermeasure verification program 121, a resource assignment program 118, and a countermeasure delivery program 120. In addition, the cloud system 101 includes a collection DB 112 and a classification result DB 114. "DB" stands for database.

In the present embodiment, the subsystems 141 defines as the verification targets of the countermeasure for the verification object are narrowed down on the basis of the following concepts (X) and (Y), and then, the countermeasure is verified.

(X) Subsystems 141 having a same or similar feature are likely to have a same fault.

(Y) Virtually reproducing the subsystem 141 by assigning resources from the resource pool 119 is easier than physically reproducing the subsystem 141.

Specific description will be given as follows.

<Before Verification>

1. Data Collection and 2. Data Storage

The data collection program 111 collects management data for each of the subsystems 141 periodically from the work environment 142 for example, and stores the collected management data in the collection DB 112. The collected management data includes at least one type of data among environment data, SDS data, and performance data. The environment data includes data related to the configuration of the subsystem 141, namely, the type of the subsystem 141 (whether it is a server or a VM), computer resources (for example, implemented hardware) included in the subsystem 141, and data related to the type of hypervisor executed by the subsystem 141, for example. The SDS data includes data related to SDS executed by the subsystem 141, namely, RAID type (a set of RAID level (for example, RAID 5) and RAID configuration (for example, 3D+1P)), and data related to the number of logical volumes held, for example. The performance data includes data related to the performance of the SDS, namely, data related to the processor operation rate, the average response time (for example, per logical volume or per port), and average I/O throughput (for example, per logical volume or per port), for example.

3. Data Reading and 4. Environment Classification (Clustering)

The environment classification program 113 reads predetermined data from the collection DB 112. "Predetermined data" is data needed for environment classification. The environment classification program 113 executes environment classification on the basis of the predetermined data and stores classification result data representing a classification result in the classification result DB 114. As illustrated in FIG. 1, the classification result data includes, for each of the environment groups, the ID of the environment group and the ID (for example name) of the subsystem 141 (member) belonging to the environment group.

Figure 2:
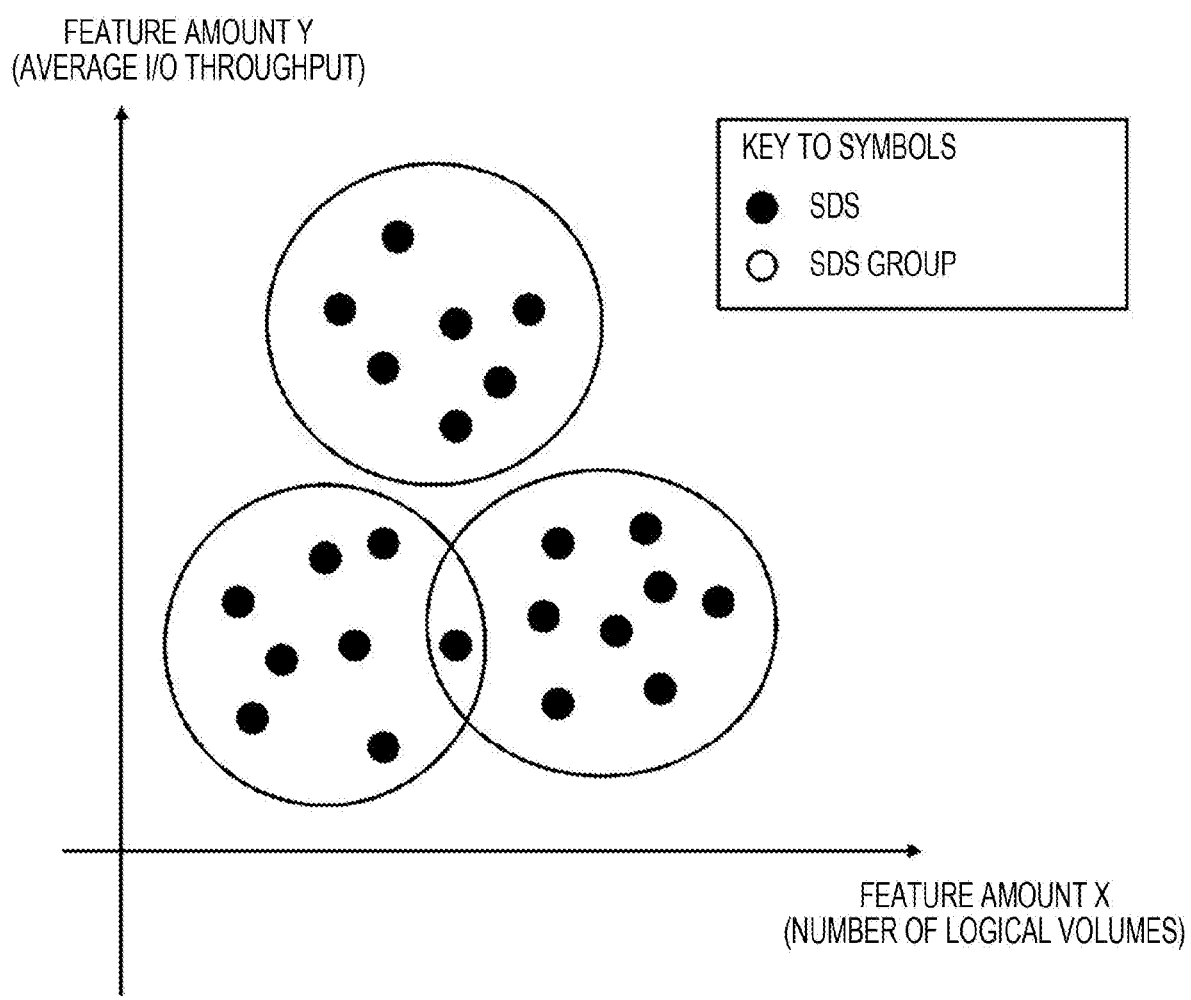
FIG. 2 is a schematic diagram illustrating an example of environment classification.

In the present embodiment, "environment classification" is to classify a plurality of subsystems 141 (execution environment of SDS) on the basis of similarity level of SDS features. Execution of the environment classification results in formation of an environment group which is a group of the subsystems 141. The subsystems 141 (members) belonging to the same environment group are subsystems 141 that execute SDS having similar SDS features. The number or range of environment groups depends on the number of pieces of SDS and SDS features. In the subsystem 141, the SDS feature is a feature of the SDS executed in that subsystem 141. In the present embodiment, the SDS feature of the SDS is a feature vector that follows N values (feature amount) respectively represented by N types (N is a natural number) of data for the SDS. That is, according to the present embodiment, "N types of data" correspond to "predetermined data". The SDS feature follows the coordinates in the coordinate system based on N axes corresponding to N types of data. The similarity level of the SDS feature may be a cosine similarity level which is an angle formed by two feature vectors or a distance between SDS features (coordinates). FIG. 2 is a schematic diagram illustrating an example of environment classification. According to the example of FIG. 2, N=2 is established, and the first type of data is the number of logical volumes. The second type of data is the average I/O throughput. Subsystems 141 that execute SDS belonging to the same SDS group are classified into the same environment group.

"3. Data reading" and "4. Environment classification (clustering)" may be performed as appropriate (corresponding to increase or decrease of SDS, or increase of management data accumulated in collection DB 112). For example, the newly added SDS may be classified into one of the SDS groups, and thereafter, "3. Data reading" and "4. Environment classification (clustering)" may be performed for all SDS including that SDS, and the number or members of environment groups may be changed as a result.

Note that the method (e.g. algorithm) of the environment classification (clustering) is not limited to the example with reference to FIG. 2, and other types of methods may be adopted.

<Verification and Release>

5. Fault Data Input

Fault data is input to the verification target selection program 115. The fault data includes data related to a fault (e.g., bug) of the SDS, that is, data related to occurrence location, occurrence time, fault outline and fault details for each of one or more faults, for example. The fault data is input automatically or manually. The fault of SDS is an example of a problem of SDS. The problem of SDS may include manually input problems instead of or in addition to automatically detected faults.

The following processing of "6. Verification target decision" to "14. Verification result notification" is performed for each of faults indicated by the fault data input in "5. Fault data input". Hereinafter, one fault will be described as an example. In description of "6. Determination of verification target" to "14. Verification result notification", the fault will be referred to as a "target fault".

6. Determination of Verification Target

The verification target selection program 115 specifies the environment group including the subsystem 141 having a location of occurrence of the target fault from the classification result DB 114. The subsystem 141 (member) belonging to the specified environment group is the verification target.

7. Verification Target Notification

The verification target selection program 115 notifies the environment construction program 116 of the IDs of the respective subsystems 141 (members) belonging to the environment group specified in "6. Determination of verification target".

8. Data Reading

The environment construction program 116 reads data associated with each of the notified subsystems ID from the collection DB 112. The data read here is data of a type necessary for reproducing the subsystem 141 corresponding to the subsystem ID (for example, data representing the configuration of the subsystem 141, such as a resource type, a resource model number).

9. Environment Construction Instructions

For each of the notified subsystem ID, the environment construction program 116 instructs the resource assignment program 118 to construct an environment of the subsystem 141 according to the data read in "8. Data reading".

10. Resource Determination

The resource assignment program 118 receives the instruction issued in "9. Environment construction instruction". The resource assignment program 118 determines, from the resource pool 119, computer resources necessary for constructing the environment of the subsystem 141, for each of the subsystems 141 that follow the instruction.

11. Environment Reproduction

The resource assignment program 118 constructs an environment in which the computer resources determined in "10. Resource determination" are assigned to each of the subsystems 141 following the instruction issued in "9. Environment construction instruction". Such an environment construction is environment reproduction, that is, subsystem reproduction. The environment is virtually reproduced. That is, the constructed environment is the VM 21. Regardless of whether the subsystem 141 is the server 141S or the VM 141V for each of the subsystems 141 belonging to the environment group specified in "6. Determination of verification target" (regardless of whether it is the physical subsystem 141 or virtual subsystem 141), the reproduced subsystem is the VM 21. Hereinafter, the VM 21 will be referred to as a "reproduction VM 21". The success in evoking the same fault as the target fault in the reproduction VM 21 indicates the success in reproduction. Conversely, the failure in evoking the same fault as the target fault in the reproduction VM indicates the failure in reproduction. In the reproduction VM successful in reproduction, the same SDS as the faulty SDS (for example, the same version) is executed. In the reproduction VM successful in reproduction, (in reproduction VM successful in evoking the same fault as the target fault), the same SDS as the faulty SDS is executed and this reproduction VM is defined as the verification target of the countermeasure (application target of the verification object) to be described below. In other words, the reproduction VM of reproduction failure (reproduction VM that failed in evoking the same fault as the target fault) is excluded from the verification target of the countermeasure. This will further contribute to the appropriate narrowing down of the verification target of the countermeasure.

12. Verification Instruction

The environment construction program 116 instructs the countermeasure verification program 121 to verify the countermeasure corresponding to the target fault.

13. Countermeasure Verification

The countermeasure verification program 121 receives the instruction issued in "12. Verification instruction". In response to the instruction, the countermeasure verification program 121 applies a countermeasure to the SDS executed in the reproduction VM successful in reproduction. The countermeasure verification program 121 checks whether the same fault as the target fault occurs in the reproduction VM to which the countermeasure has been applied. In a case where no same fault occurs, the countermeasure for the subsystem 141 corresponding to the reproduction VM is successful. In addition, the countermeasure verification program 121 checks whether a side effect occurs in the reproduction VM to which the countermeasure has been applied. "Side effects" are secondary effects due to application of countermeasures. Side effects might sometimes be an increase in the average response time and a decrease in the average I/O throughput, or vice versa, a decrease in the average response time and an increase in the average I/O throughput. Whether the side effect is a good effect or an adverse effect is considered to depend on the user.

14. Verification Result Notification

The countermeasure verification program 121 notifies the countermeasure delivery program 120 of the verification result data. The verification result data represents data indicating, for each of the reproduction VM for the countermeasures corresponding to the target fault, whether the countermeasure is successful (success or fault), ID of the original subsystem 141 corresponding to the reproduction VM, the name of the countermeasure, effects of the countermeasure, and side effects of the countermeasure. The verification result data may further indicate target fault occurrence probability (probability of occurrence of the target fault) for each of the original subsystems 141 corresponding to the reproduction VM with successful countermeasure. For the subsystem 141, the target fault occurrence probability is determined by the distance between the SDS feature of the subsystem 141 and the SDS feature of the subsystem 141 in which the target fault occurred (that is, distance between the coordinates in the example of FIG. 2). It may be such that the longer the distance, the lower the occurrence probability, and the shorter the distance, the higher the occurrence probability.

The following "15. Countermeasure delivery" and "16. Application of countermeasure" are performed for the fault data input in "5. Fault data input".

15. Countermeasure Delivery (Release), and 16. Application of Countermeasure

The countermeasure delivery program 120 delivers a countermeasure package to the user management computer 131 on the basis of the verification result data corresponding to the countermeasure of the fault for each of faults represented by the fault data. The countermeasure package is an information package related to countermeasures corresponding to the fault, and contains, for example, a successful countermeasure and the ID of the countermeasure application subsystem 141. The user management computer 131 applies the countermeasure contained in the countermeasure package to the application subsystem 141 as a countermeasure application target in response to the manual instruction from the administrator (or automatically).

The countermeasure package may contain verification result data concerning countermeasures instead of or in addition to countermeasures. The user management computer 131 can display a management screen based on the verification result data in the countermeasure package. According to an example in FIG. 3, a management screen 1500 is a graphical user interface (GUI), for example, and includes, concerning a fault having a high occurrence probability (for example, occurrence probability is 50% or more) and a fault with low occurrence probability (for example, occurrence probability is less than 50%), outline of the fault, the ID of the subsystem 141 in which the fault can occur, the outline of the countermeasure for the fault, the effects of the countermeasure, the side effects of the countermeasure, and a user interface (UI) that receives whether the countermeasure is to be applied from the administrator. The administrator inputs whether countermeasure is to be applied for each of faults on the management screen. The user management computer 131 applies the countermeasure designated to be applied to the subsystem 141 associated with the countermeasure. The display concerning countermeasures is classified on the basis of the fault occurrence probability, leading to high convenience for the administrator. For example, the administrator can decide to apply a countermeasure preferentially to the fault with high occurrence probability.

The description above is the overall flow.

Generally, in an environment in which the relationship between software and hardware is close (typically an environment in which the software is executed by hardware dedicated to the software), the types of resources used to execute the software are limited and therefore, the range of verification target of the countermeasure corresponding to the fault of the software is small.

In a case where the software is SDS, however, the SDS can operate on a general-purpose computer or can operate on VM1. That is, computer systems existing in the world can be an execution environment for SDS. It is typically desired to verify the type of computer system for which the countermeasure can be effective before release of the countermeasure (for example, patches) for the fault (bug, for example). However, setting all computer systems on which the SDS can operate as verification target would be impractical.

According to the present embodiment, it is possible to narrow down the verification targets of the countermeasure for the fault. In other words, there is no need to designate all the subsystems 141 as the verification target of the countermeasure. This leads to reduction of the time before release of the countermeasure.

Furthermore, according to the present embodiment, the plurality of subsystems 141 is classified into a plurality of environment groups. Each of the environment groups is a group including the subsystems 141 having similar SDS features. The verification target that has been narrowed down is an environment group to which the faulty subsystem 141 belongs. The same fault is likely to occur in the subsystem 141 having the same or similar SDS feature. Such a subsystem 141 can be preferentially adopted as a verification target of the countermeasure. In other words, among the different subsystems 141 on which the same SDS (for example, the SDS of same version) operates, the subsystem 141 having the SDS feature of low similarity level to the SDS feature of the faulty SDS would be excluded from the countermeasure verification target. This further contributes to reduction of the time before release of the countermeasure.

Hereinafter, the present embodiment will be described in detail.

Figure 4:
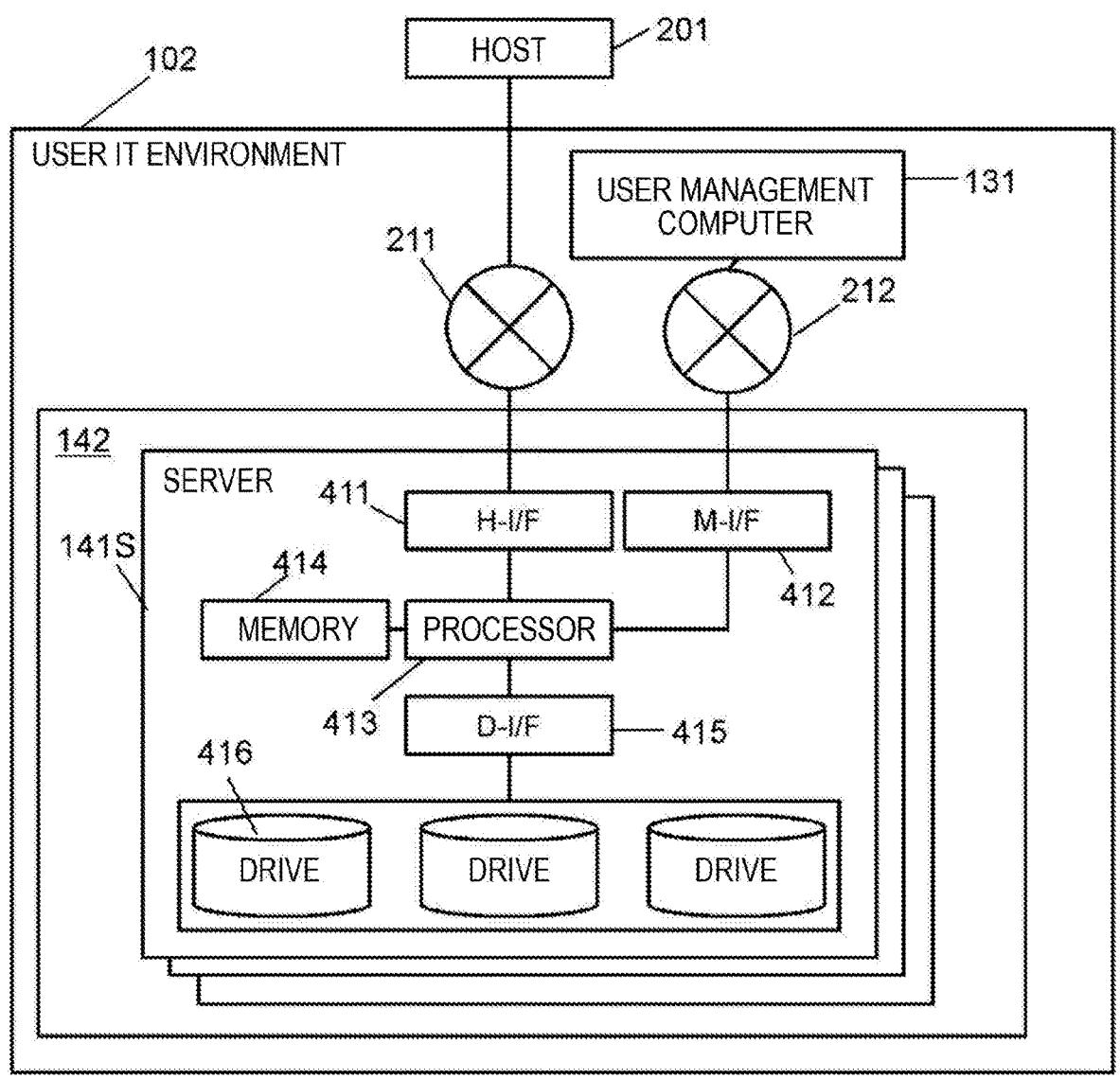
FIG. 4 is a block diagram illustrating a configuration of a user IT environment.

FIG. 4 is a block diagram illustrating a configuration of the user IT environment 102.

The user IT environment 102 includes the work environment 142 and the user management computer 131, as described above.

The work environment 142 includes a plurality of the servers (physical servers) 141S. The at least one of the servers 141S may be a general-purpose computer. The server 141S includes a plurality of drives 416. The server 141S includes: an host interface device (H-I/F) 411 connected to a host system (hereinafter, host) 201; a management interface device (M-I/F) 412 connected to the user management computer 131; a drive interface device (D-I/F) 415 connected to a plurality of drives 416; a memory 414; and a processor 413 connected to these components 411, 412, 415 and 414. The H-I/F 411 may be a host bus adapter (HBA), for example. The M-I/F 412 may be a network interface card (NIC), for example. The host 201 and the H-I/F 411 are connected via a network 211. The user management computer 131 and the M-I/F 412 are connected via a network 212. The networks 211 and 212 may be the same. Each of the networks 211 and 212 may be any of a fiber channel storage area network (FC SAN), an Internet protocol storage area network (IP SAN), a local area network (LAN), and a wide area network (WAN). At least one of the networks 211 and 212 may be a network external to the user IT environment 102.

In this manner, the server 141S includes physical computer resources including the drive 416, the H-I/F 411, the M-I/F 412, the D-I/F 415, the memory 414, and the processor 413. The VM 141V may be executed on the server 141S. For example, hypervisor may be executed, a VM may be generated by the hypervisor, and the generated VM may be executed, on the server 141S. The SDS is executed on the server 141S (an example of a physical subsystem) or a VM (an example of a virtual subsystem). The SDS provides a logical volume to the host 201. The SDS receives from the host 201, an I/O command (for example, a write command or a read command) designating a logical volume, and processes the I/O command.

Figure 5:
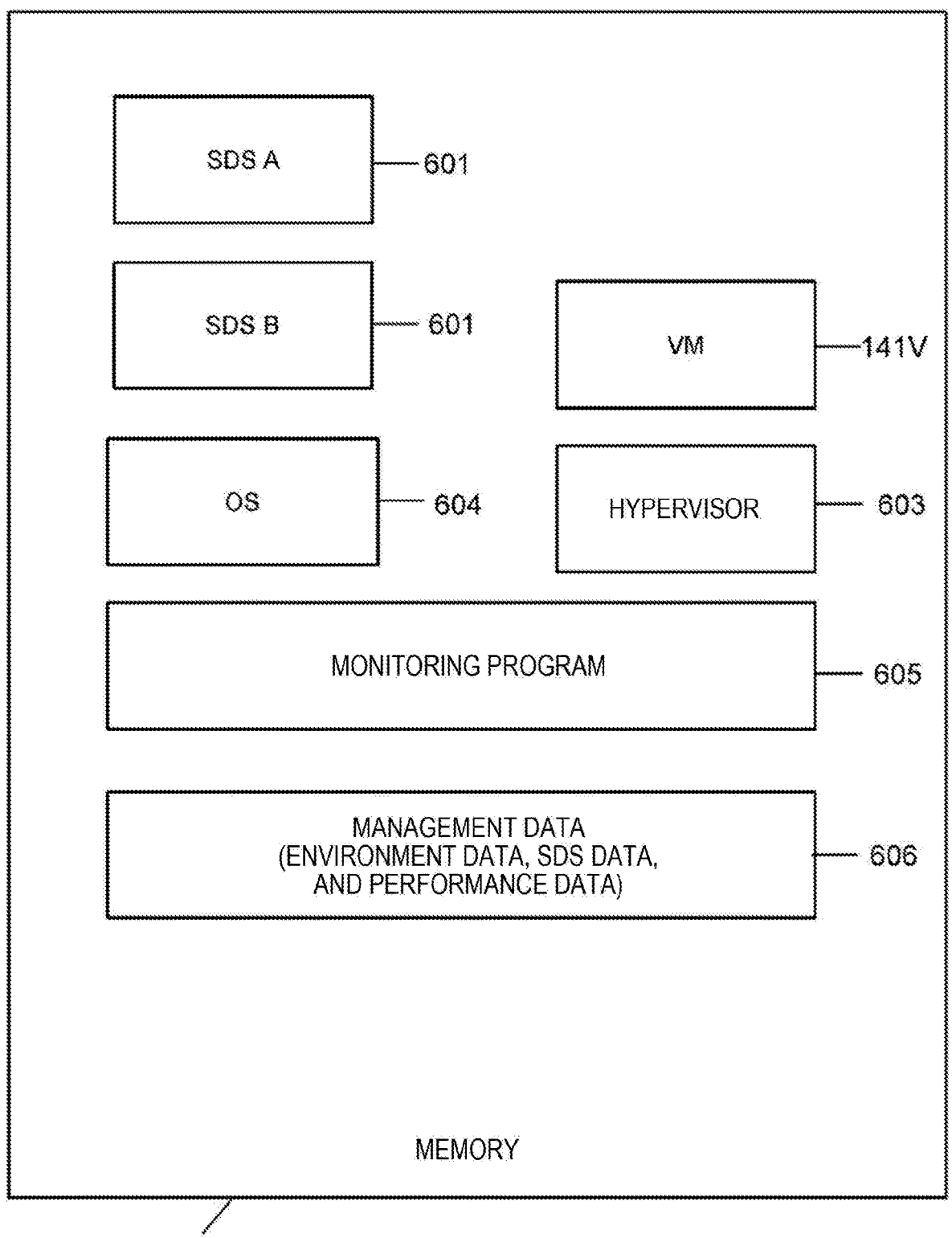
FIG. 5 is a block diagram illustrating a program and data in a memory of a server within a user IT environment.

FIG. 5 is a block diagram illustrating programs and data in the memory 414.

The program in the memory 414 is executed by the processor 413.

SDS 601 is executed. SDS A and SDS B are executed on an operating system (OS) 604. The SDS A and the SDS B are examples of SDS executed on the server 141S, not on the VM 141V. Note that SDS may be executed on the VM 141V. The VM 141V is generated by a hypervisor 603, for example.

A monitoring program 605 is executed. The monitoring program 605 obtains the hardware configuration of the server 141S, the configuration of the SDS 601, the performance of the SDS 601, or the like, and reflects the obtained information to the management data.

Management data 606 is stored in the memory 414. At least a portion of the management data 606 may be stored in the drive 416. The management data 606 includes environment data, SDS data, and performance data.

FIG. 6 is a schematic diagram illustrating a configuration of environment data.

The environment data 600 includes data related to the configuration of the server 141S (for example, the resource of the server 141S). In a case where the VM is under execution, the environment data 600 may include data related to the configuration of the VM (for example, resource of the VM) in addition to the data related to the configuration of the server 141S.

FIG. 7 is a schematic diagram illustrating the structure of the SDS data.

The SDS data 700 includes data related to the SDS 601. According to the SDS data 700, the number of pieces of SDS in operation is "two". The RAID categories, or the like may be data for each of SDS 601 during operation.

FIG. 8 is a schematic diagram illustrating a configuration of performance data.

Performance data 800 includes data related to the performance of the SDS 601. For example, the performance data 800 may include an average response time and an average I/O throughput, etc., for each of logical volumes, and may include a response time or the like for each of received I/O commands.

Figure 9:
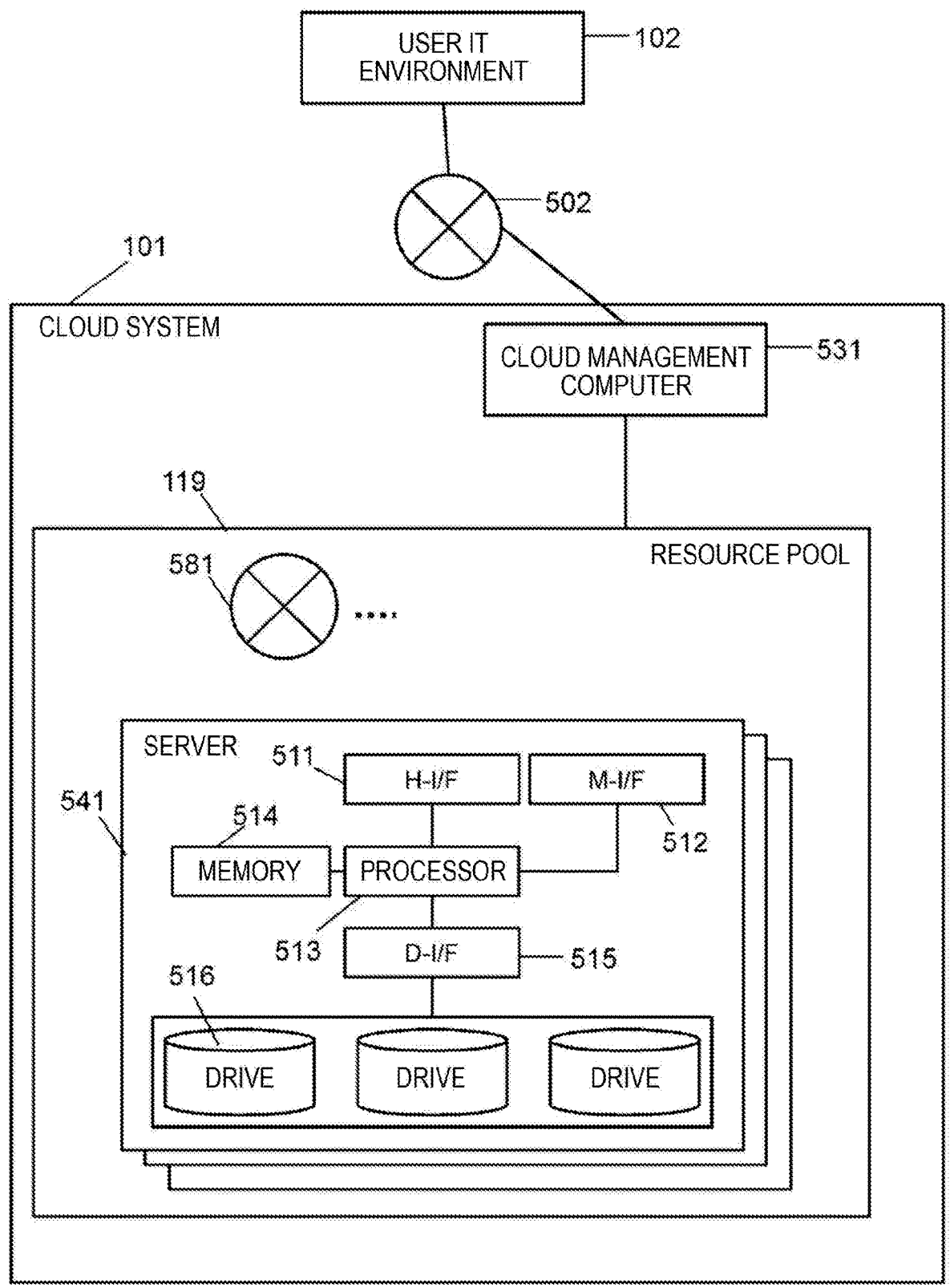
FIG. 9 is a block diagram illustrating a configuration of a cloud system.

FIG. 9 is a block diagram illustrating a configuration of the cloud system 101.

The cloud system 101 may be a public cloud system or a private cloud system. The public cloud system is a system that is operated or managed by an organization different from the user, and is generally accessed from a large number of unspecified users via the Internet. The private cloud system is a system operated or managed by the same organization as the user.

The cloud system 101 includes a resource pool 119 and a management computer (hereinafter referred to as a cloud management computer) 531 that manages the resource pool 119. The cloud management computer 531 is connected to the user IT environment 102 via a network 502. The network 502 may include the network 212 described above, for example.

The resource pool 119 is a set of a plurality of computer resources including a plurality of types of computer resources. For example, the resource pool 119 includes a network 581 and a plurality of servers 541. The server 541S includes a plurality of drives 516. Furthermore, the server 541 includes an H-I/F 511, an M-I/F 512, a D-I/F 515, a memory 514, and a processor 513 connected to these devices.

One or more processors execute the data collection program 111, the environment classification program 113, the verification target selection program 115, the environment construction program 116, the countermeasure verification program 121, the resource assignment program 118, and the countermeasure delivery program 120. The one or more processors may be present in at least one of the servers or the cloud management computer 531. The server may be a server 541 included in the resource pool 119 or the server outside the resource pool 119.

In the present embodiment, the processor in the cloud management computer 531 execute the data collection program 111, the environment classification program 113, the verification target selection program 115, the environment construction program 116, the countermeasure verification program 121, the resource assignment program 118, and the countermeasure delivery program 120. Therefore, the cloud management computer 531 is an example of a countermeasure verification assistance system. An example of the countermeasure verification assistance system may be the cloud system 101 including the cloud management computer 531 or may be the cloud system 101 other than the cloud management computer 531 (for example, the cloud management computer 531 exists outside the cloud system 101). For example, at least one of the above-described programs 111, 113, 115, 116, 121, 118 and 120 may be executed by one or more processors inside or outside the resource pool.

Figure 10:
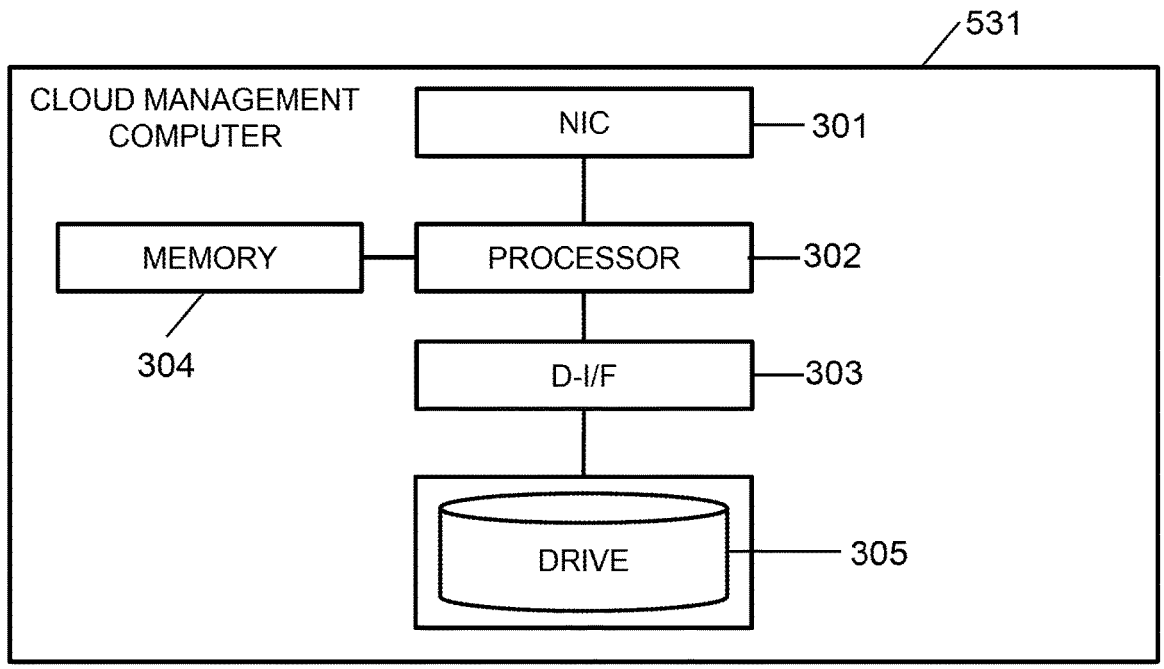
FIG. 10 is a block diagram illustrating a configuration of a cloud management computer.

FIG. 10 is a block diagram illustrating a configuration of the cloud management computer 531.

The cloud management computer 531 has a drive 305. Furthermore, the cloud management computer 531 includes a NIC 301, a D-I/F 303, a memory 304, and a processor 302 connected to these devices. The NIC 301 is an interface device connected to the network 502. The D-I/F 303 is an interface device connected to the drive 305. The memory 304 stores programs and data. The processor 302 executes a program in the memory 304. The NIC 301 and the D-I/F 303 are examples of the interface unit, the memory 304 is an example of a memory unit, and the processor 302 is an example of a processor unit. The drive 305 may be included in the memory unit.

Figure 11:
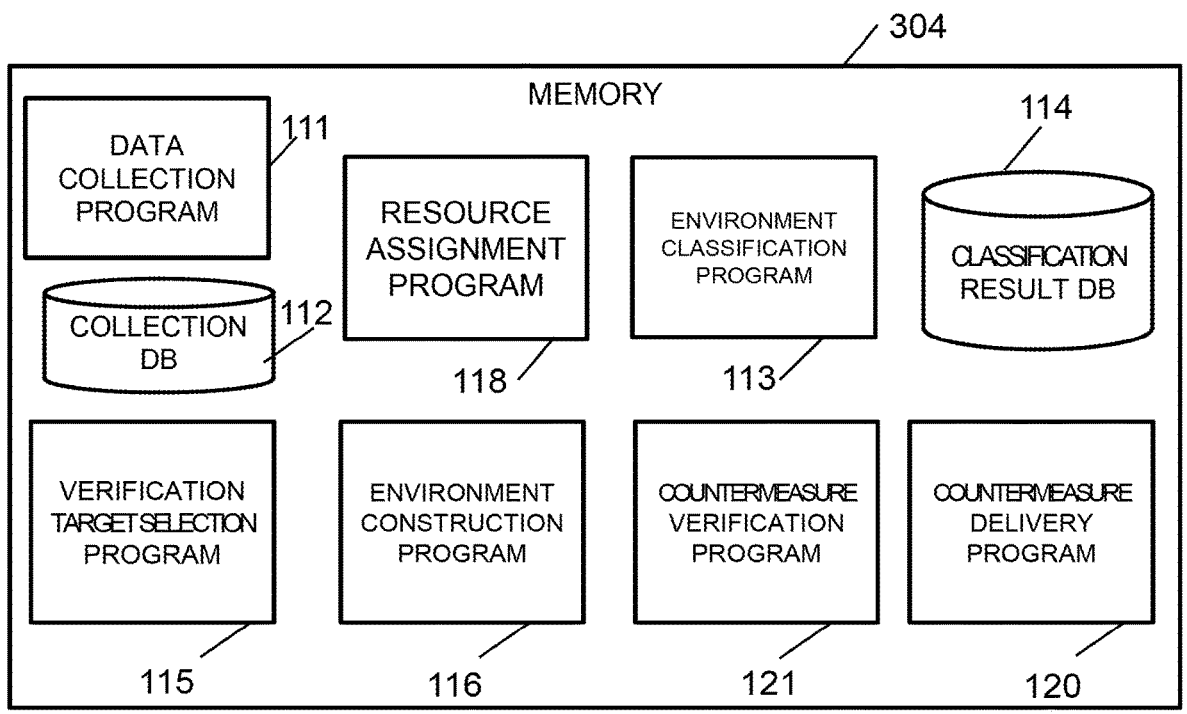
FIG. 11 is a block diagram illustrating a program and data in a memory of a cloud management computer.

FIG. 11 is a block diagram illustrating programs and data in the memory 304.

The memory 304 stores the data collection program 111, the environment classification program 113, the verification target selection program 115, the environment construction program 116, the countermeasure verification program 121, the resource assignment program 118, and the countermeasure delivery program 120. Furthermore, the memory 304 stores the collection DB 112 and the classification result DB 114. At least a portion of the collection DB 112 and the classification result DB 114 may be stored in the drive 305.

FIG. 12 is a schematic diagram illustrating a configuration of fault data.

As described above, fault data 1200 includes data related to the fault (bug, for example) of the SDS 601, namely, data related to occurrence location, occurrence time, fault summary, and fault details for each of one or more faults, for example. The fault may be a hardware fault or a software fault.

Hereinafter, details of the processing performed in the present embodiment will be described.

Figure 13:
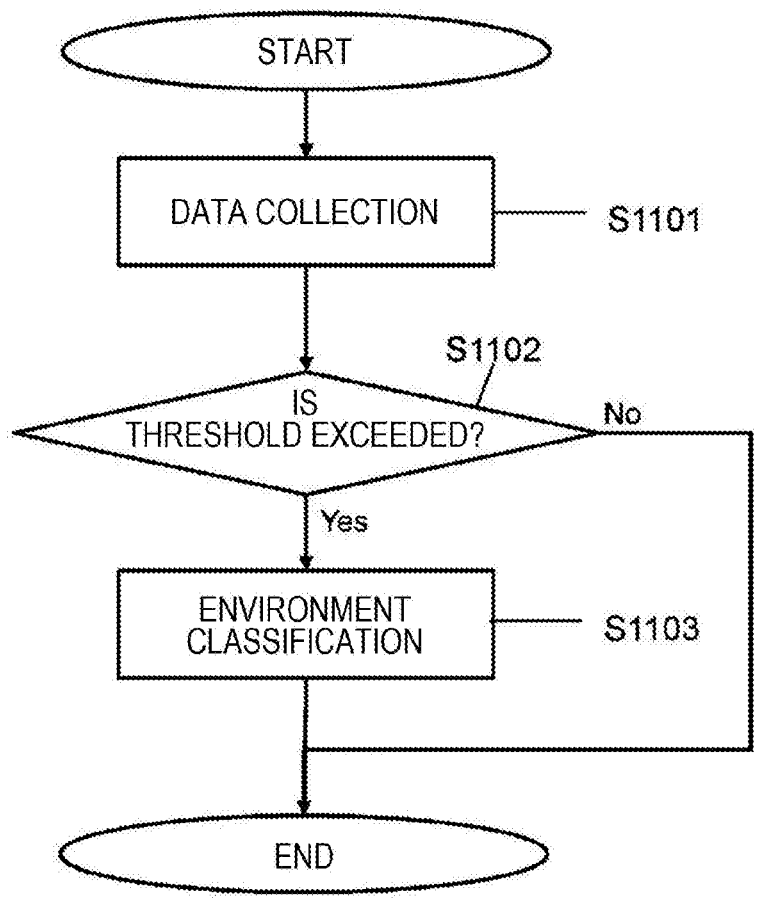
FIG. 13 is a flowchart illustrating a flow of processing before verification.

FIG. 13 is a flowchart illustrating a flow of processing before verification. This processing is executed periodically, for example.

The data collection program 111 collects the management data 606 for each subsystem 141 from the work environment 142 and stores the collected management data 606 in the collection DB 112 (S1101).

The environment classification program 113 refers to the collection DB 112 and determines whether a threshold has been exceeded (S1102). One or more types of thresholds may be present. The threshold may be a threshold such as an increase rate of the management data 606 size or the number of the SDS 601. The threshold may be tuned by an administrator of the cloud system 101.

When a determination result S1102 is true (S1102: Yes), the environment classification program 113 executes environment classification on the basis of the data in the collection DB 112 and stores a classification result in the classification result DB 114 (S1103). This allows a new classification result to be stored in the classification result DB 114. As described with reference to FIG. 1, the classification result includes the ID of an environment group and the ID of the subsystem 141 belonging to the environment group, for each of the environment groups.

When the determination result in S1102 is false (S1102: No), the environment classification program 113 skips S1103. This maintains existing classification results in the classification result DB 114.

Figure 14:
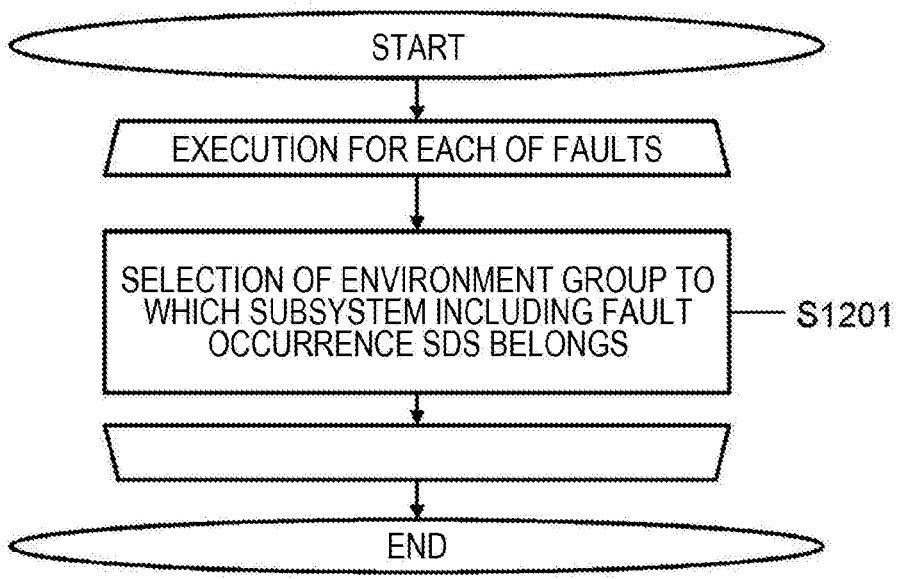
FIG. 14 is a flowchart illustrating a flow of processing executed by a verification target selection program.

FIG. 14 is a flowchart illustrating a flow of processing executed by the verification target selection program 115. This processing is started when the fault data 1200 is input.

The verification target selection program 115 selects an environment group to which the subsystem 141 including the faulty SDS 601 belongs from the classification result DB 114 for each of fault indicated by the input fault data 1200 (S1201).

Figure 15:
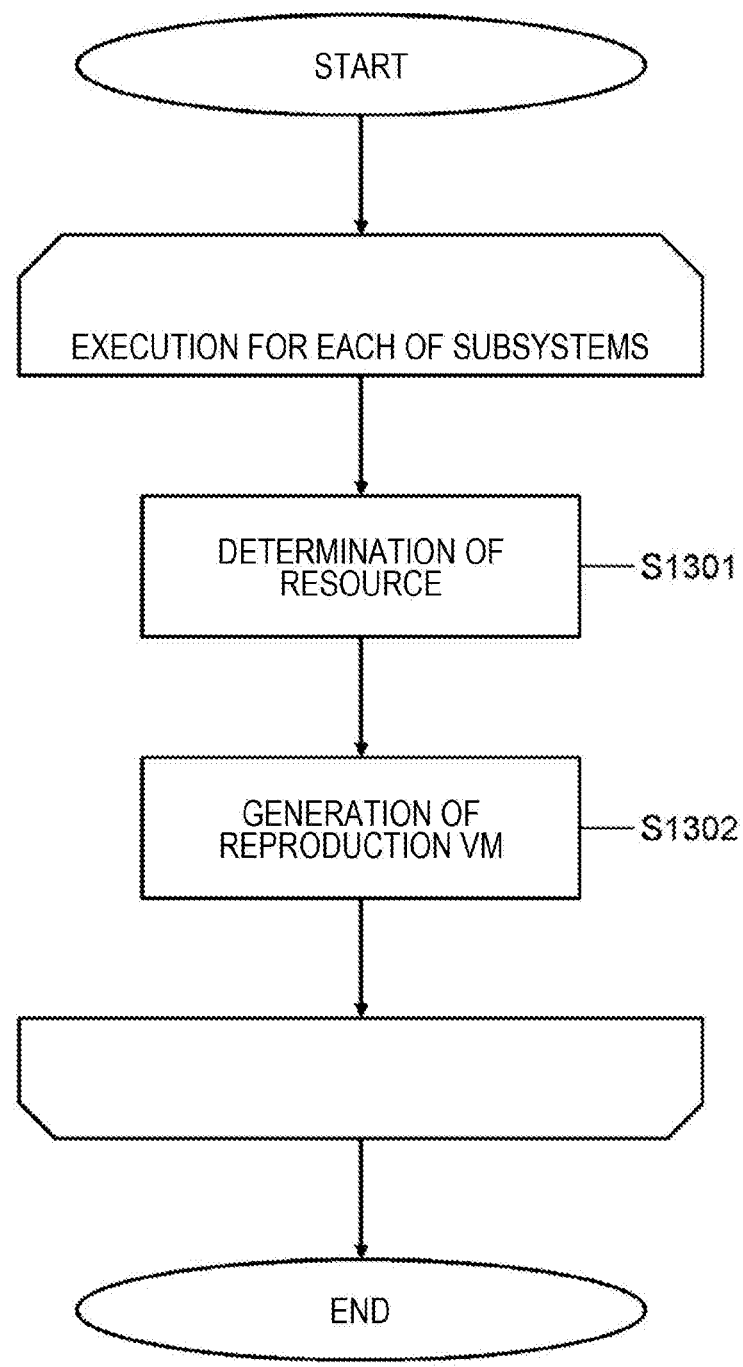
FIG. 15 is a flowchart illustrating a flow of processing executed by a resource assignment program.

FIG. 15 is a flowchart illustrating a flow of processing executed by the resource assignment program 118. This processing is started when an environment construction instruction is received from the environment construction program 116.

The resource assignment program 118 performs the following processing for each of the subsystem 141 according to the environment construction instruction. Hereinafter, one subsystem 141 will be taken as an example. In the description of FIG. 15, the subsystem 141 is referred to as "target subsystem 141". For each of the subsystems 141 belonging to the environment group selected in the processing illustrated in FIG. 14, the environment construction instruction is associated with data read out by the environment construction program 116 from the collection DB 112 for that subsystem 141 (for example, data representing the configuration of the subsystem 141).

The resource assignment program 118 executes S1301. That is, the resource assignment program 118 specifies data representing the configuration of the target subsystem 141, among the data associated with the environment construction instruction. The resource assignment program 118 determines from the resource pool 119 a computer resource equivalent to the computer resource represented by the specified data.

The resource assignment program 118 executes S1302. That is, the resource assignment program 118 generates the VM 21 to which the computer resource determined in S1301 is assigned. The generated VM 21 is the reproduction VM 21. In a case where the target subsystem 141 is a VM 141V, the configuration of the reproduction VM 21 is same as the configuration of the VM 141V as the target subsystem 141. In a case where the target subsystem 141 is the server 141S, the configuration of the reproduction VM 21 is equivalent to that of the server 141S which is the target subsystem 141.

Figure 16:
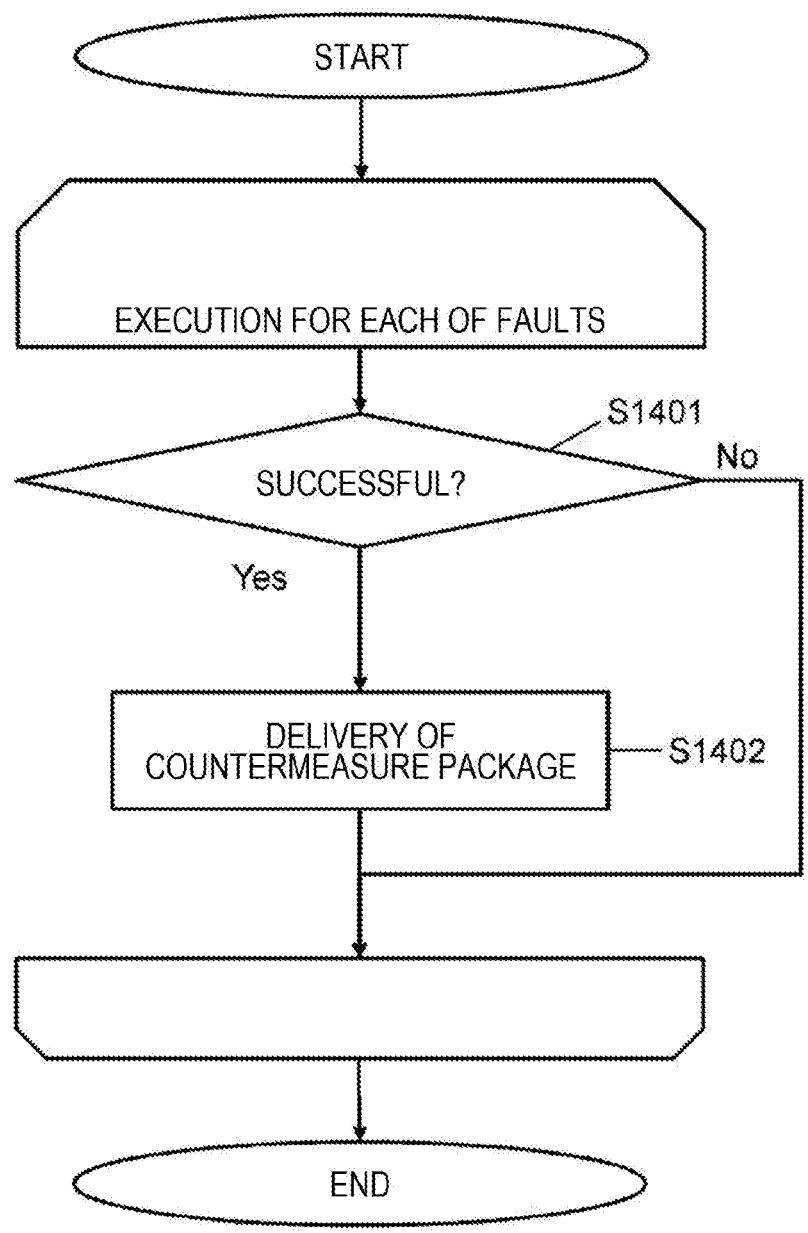
FIG. 16 is a flowchart illustrating a flow of processing executed by a countermeasure delivery program.

FIG. 16 is a flowchart illustrating a flow of processing executed by the countermeasure delivery program 120.

The countermeasure delivery program 120 performs the following processing for each of faults indicated by the fault data 1200. Hereinafter, one fault will be described as an example. In the explanation of FIG. 16, the fault is referred to as a "target fault".

The countermeasure delivery program 120 determines whether the countermeasure is successful for at least one reproduction VM 21 from the verification result data corresponding to the target fault countermeasure (S1401).

In a case where the determination result in S1401 is true (S1401: Yes), the countermeasure delivery program 120 delivers a countermeasure package to the user management computer 131. The countermeasure package contains, for example, a successful countermeasure and the ID of the subsystem 141 (that is, the application target subsystem 141) corresponding to the reproduction VM 21 in which the countermeasure was successful. The user management computer 131 applies the countermeasure contained in the countermeasure package to the application subsystem 141 as a countermeasure application target in response to the manual instruction from the administrator (or automatically).

Second Embodiment

A second embodiment will be described. At that time, differences from the first embodiment will mainly be described, and description common to the first and second embodiments will be omitted or simplified.

In the embodiment, there is a case where a scale smaller than the scale of the computer resources of the original subsystem 141 is adopted as the scale (for example, number of resources or resource performance) of the computer resources for the reproduction VM 21 for at least one subsystem 141 in the above "10. Resource determination"

and "11. Environment reproduction". Hereinafter, the reproduction VM 21 to which the computer resources of a scale smaller than the computer resource scale of the original subsystem 141 is assigned will be referred to as a "small-scale reproduction VM 21". It is preferable that the resource ratio (ratio of the amount of various resources) is the same between the small-scale reproduction VM 21 and the original subsystem 141. Success in evoking the same fault as the target fault in the small-scale reproduction VM 21 indicates the success in reproduction. This case means that the reproduction is successful with a small amount of resources, leading to achievement of saving of the computer resources in the resource pool 119. In a case where reproduction failed, the reproduction VM 21 may be expanded (scale of the computer resource of the small-scale reproduction VM 21 is enlarged) while maintaining the same resource ratio, and whether the reproduction is success or failure may be determined for the reproduction VM 21 after the expansion.

Figure 17:
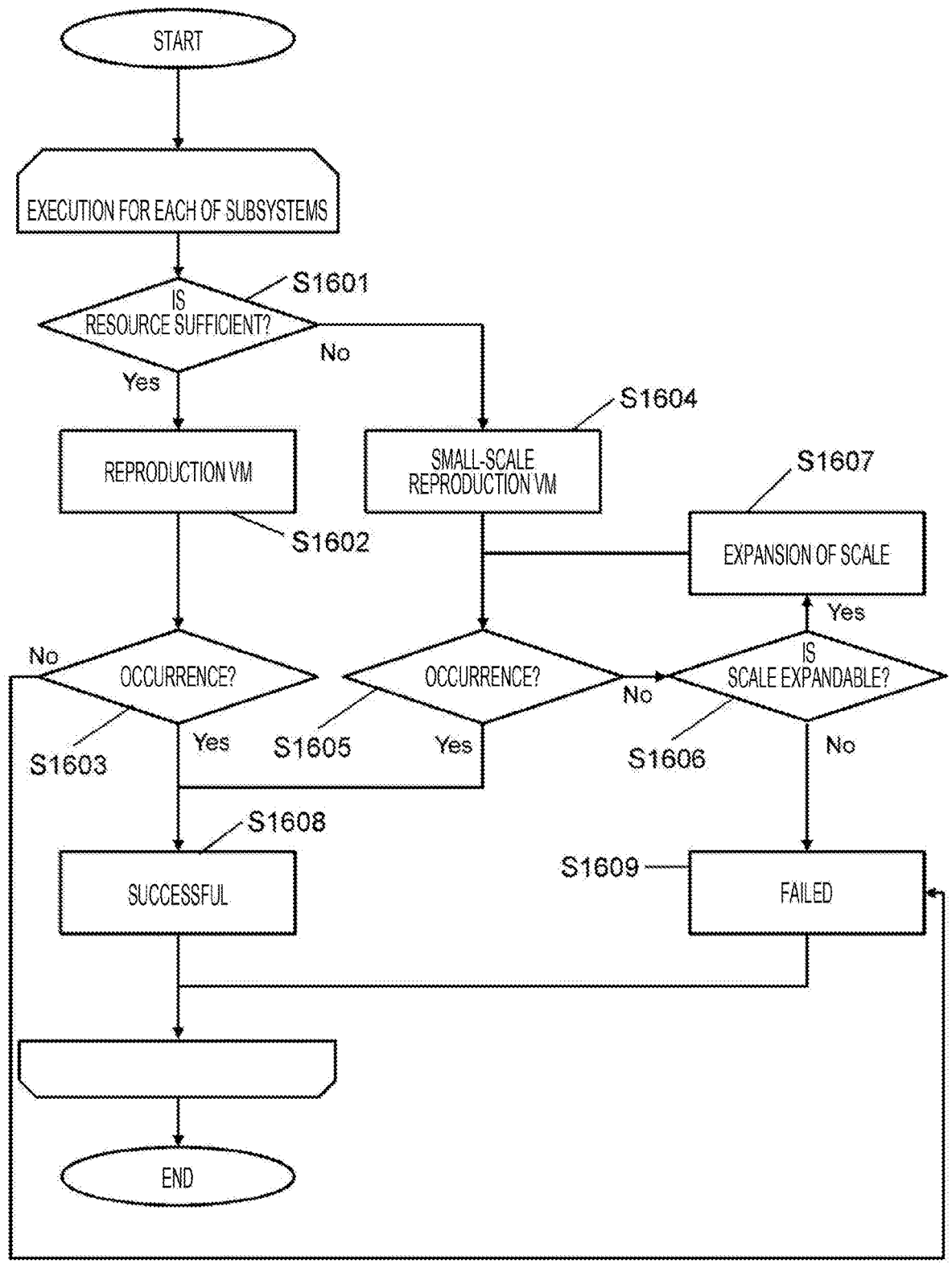
FIG. 17 is a flowchart illustrating a flow of processing executed by a resource assignment program in a second embodiment.

FIG. 17 is a flowchart illustrating a flow of processing executed by a resource assignment program in the second embodiment. This processing is also started when an environmental construction instruction is received similarly to the first embodiment. Hereinafter, the resource assignment program in the second embodiment will be referred to as a "resource assignment program 118'".

The resource assignment program 118' performs the following processing for each of the subsystem 141 according to an environment construction instruction of the program. Hereinafter, one fault and one subsystem 141 will be taken as an example. In the description of FIG. 17, the fault is referred to as a "target fault", and its subsystem 141 is referred to as the "target subsystem 141". The data associated with an environment construction instruction includes data representing the configuration of the target subsystem 141.

The resource assignment program 118' determines whether resources are sufficient (S1601). That is, the resource assignment program 118' determines whether a resource that can be assigned being the same as or equivalent to the resource of the target subsystem 141 exists in the resource pool 119 on the basis of the data representing the configuration of the target subsystem 141.

In a case where the determination result in S1601 is true (S1601: Yes), the resource assignment program 118' generates a reproduction VM 21 assigned from the resource pool 119 with the same or equivalent resource as the resource of the target subsystem 141 (S1602). The resource assignment program 118' determines whether the same fault as the target fault can be evoked in the reproduction VM 21 (S1603).

In a case where the same fault as the target fault occurs in the reproduction VM 21 (S1603: Yes), the reproduction is successful (S1608). In this case, the reproduction VM 21 is the verification target. That is, the countermeasure is applied to the reproduction VM (reproduction VM that has executed SDS same (same version) as the SDS in which the target fault has occurred).

In contrast, in a case where the same fault as the target fault does not occur in the reproduction VM 21 (S1603: No), the reproduction is a failure (S1609).

When the determination result of S1601 is false (S1601: No), that is, when the resources are insufficient, the resource assignment program 118' generates the small-scale reproduction VM 21 (S1604). The resource ratio (ratio of the amount of various resources) is the same in the small-scale reproduction VM 21 and the target subsystem 141. The resource assignment program 118' determines whether the same fault as the target fault can be evoked in the small-scale reproduction VM 21 (S1605).

In a case where the same fault as the target fault occurs in the small-scale reproduction VM 21 (S1605: Yes), the reproduction is successful (S1608). In this case, the small-scale reproduction VM 21 is the verification target. That is, the countermeasure is applied to the small-scale reproduction VM (small-scale reproduction VM that has executed SDS same (same version) as the SDS in which the target fault has occurred).

In contrast, in a case where the same fault as the target fault does not occur in the small-scale reproduction VM 21 (S1605: No), a resource assignment program 118' determines whether the scale of the small-scale reproduction VM 21 can be expanded (for example, whether resources that can be expanded with the resource ratio are present in the resource pool 119) (S1606). In a case where the determination result in S1606 is true (S1606: Yes), the resource assignment program 118' expands the scale of the resource configuration of the small-scale reproduction VM 21 and executes S1605 for the small scale reproduction VM 21 after expansion. In a case where the determination result in S1606 is false (S1606: No), reproduction is a failure (S1609).

In a case where the resource is insufficient, the reproduction VM 21 gradually expands from the small scale to the size of the target subsystem 141. This makes it possible to appropriately narrow down the verification targets of the fault countermeasure (efficiently verify the countermeasure) while saving resources.

Note that it is allowable to configure such that the small-scale reproduction VM 21 is generated regardless of whether the resource is insufficient.

Several embodiments described above are just examples for illustrating the present invention, and the scope of the present invention is not limited to these embodiments. The present invention can be implemented in various other forms.

For example, Software-Defined anything (SDx) executed in the plurality of subsystems 141 in a user system (one example is the work environment 142) may be another type of SDx (one or both of Software-Defined Infrastructure (SDI) and Software-Defined Datacenter (SDDC) in place of or in addition to the SDS.

Furthermore, for example, the cloud system 101 is an example of a computer system in which environment reproduction is performed. The computer system may be a system including one or more general-purpose servers including one or more general-purpose CPUs. The computer system may have a drive such as an Solid State Drive (SSD), and a server program (for example, a virtual server) that issues an I/O command and a storage program (SDS, for example) that receives and processes the I/O command may be executed by a processor unit of the computer system (a general-purpose processor or another type of processor, for example). The data according to the I/O command received by the storage program may be stored in the drive.

REFERENCE SIGNS LIST 101 cloud system

The invention claimed is:

1. A countermeasure verification assistance system comprising:
an interface unit including one or more interfaces including an interface into which problem data being data related to a problem is input;
a memory unit including one or more memories; and a processor unit including one or more processors connected to the interface unit and the memory unit,
wherein the processor unit
executes environment classification of classifying a plurality of subsystems among a user system including the plurality of subsystems each of which being a physical or virtual computer system into one or more environment groups being one or more groups,
stores classification result data being data as a result of the environment classification and being data representing a relationship between an environment group and a subsystem belonging to the environment group in the memory unit,
selects, from the classification result data, an environment group to which a subsystem that has undergone a problem represented by the input problem data belongs,
generates a reproduction subsystem being a virtual subsystem virtually reproducing the subsystem for each of the subsystems belonging to the selected classification result group, and
applies a countermeasure to at least one reproduction subsystem for the purpose of verifying the countermeasure for the problem.

2. The countermeasure verification assistance system according to claim 1,
wherein the problem is an SDx problem being a problem about Software-Defined anything (SDx) to be executed in at least one subsystem, and
the processor unit applies the countermeasure to the at least one reproduction subsystem executing the same SDx as the SDx that has undergone the problem for the purpose of verifying the countermeasure.

3. The countermeasure verification assistance system according to claim 2,
wherein the processor unit executes, as execution of the environment classification,
calculation of a plurality of SDx features corresponding to each of a plurality of SDx,
classification of the plurality of subsystems executing the plurality of SDx on the basis of a similarity level of the SDx feature, and
one or more subsystems that execute two or more SDx having a similarity level of SDx feature being less than a predetermined value belong to a same environment group.

4. The countermeasure verification assistance system according to claim 3,
wherein the processor unit transmits display information to a user management system being a management system of the user system,
the display information includes information indicating that a subsystem corresponding to a reproduction subsystem in which the countermeasure was successful among the plurality of subsystems is to be an application target of the countermeasure on the basis of occurrence probability of the problem for the subsystem, and
the occurrence probability of the problem for the subsystem is based on a difference between the SDx feature of SDx executed by the subsystem and the SDx feature of SDx executed by the subsystem that has undergone the problem.

5. The countermeasure verification assistance system according to claim 4,
wherein the at least one reproduction subsystem is a reproduction subsystem that has successfully evoked the same problem as the problem, out of the generated reproduction subsystem.

6. The countermeasure verification assistance system according to claim 5,
wherein the processor unit
generates a small-scale reproduction subsystem being a virtual subsystem having a resource configuration smaller than the resource configuration of the subsystem for at least one subsystem belonging to the selected classification result group, and
in a case where the generated small-scale reproduction subsystem has successfully evoked the same problem as the problem, the processor unit applies the countermeasure to the small-scale reproduction subsystem for the purpose of verifying the countermeasure of the problem.

7. The countermeasure verification assistance system according to claim 6,
wherein in a case where the generated small-scale reproduction subsystem has not successfully evoked the same problem as the problem, the processor unit expands the scale of the resource configuration of the small-scale reproduction subsystem, and
in a case where the expanded small-scale reproduction subsystem has successfully evoked the same problem as the problem, the processor unit applies the countermeasure to the expanded small-scale reproduction subsystem for the purpose of verifying the countermeasure of the problem.

8. The countermeasure verification assistance system according to claim 7,
wherein the SDx is any of Software Defined Storage (SDS), Software-Defined Infrastructure (SDI), and Software-Defined Datacenter (SDDC).

9. The countermeasure verification assistance system according to claim 1,
wherein the at least one reproduction subsystem is a reproduction subsystem that has successfully evoked the same problem as the problem, out of the generated reproduction subsystem.

10. The countermeasure verification assistance system according to claim 9,
wherein the processor unit
generates a small-scale reproduction subsystem being a virtual subsystem having a resource configuration smaller than the resource configuration of the subsystem for at least one subsystem belonging to the selected classification result group, and
in a case where the generated small-scale reproduction subsystem has successfully evoked the same problem as the problem, the processor unit applies the countermeasure to the small-scale reproduction subsystem for the purpose of verifying the countermeasure of the problem.

11. The countermeasure verification assistance system according to claim 10,
wherein in a case where the generated small-scale reproduction subsystem has not successfully evoked the same problem as the problem, the processor unit expands the scale of the resource configuration of the small-scale reproduction subsystem, and
in a case where the expanded small-scale reproduction subsystem has successfully evoked the same problem as the problem, the processor unit applies the countermeasure to the expanded small-scale reproduction subsystem for the purpose of verifying the countermeasure of the problem.

12. A countermeasure verification assistance method comprising:
- executing environment classification of classifying a plurality of subsystems among a user system including the plurality of subsystems each of which being a physical or virtual computer system into one or more environment groups being one or more groups;
- storing classification result data being data as a result of the environment classification and being data representing a relationship between an environment group and a subsystem belonging to an environment group;
- inputting problem data being data related to a problem;
- selecting, from the classification result data, an environment group to which the subsystem that has undergone the problem represented by the problem data belongs;
- generating a reproduction subsystem being a virtual subsystem virtually reproducing the subsystem for each of the subsystems belonging to the selected classification result group; and
- applying a countermeasure to at least one reproduction subsystem for the purpose of verifying the countermeasure for the problem.

* * * * *